Jan. 2, 1968  V. SPRETER ETAL  3,360,965

GAS LIGHTER

Filed July 2, 1965  6 Sheets-Sheet 1

INVENTORS.
VICTOR SPRETER
ERNEST HAMSAG
BY
Pennie, Edmonds, Morton, Taylor and Adams
ATTORNEYS

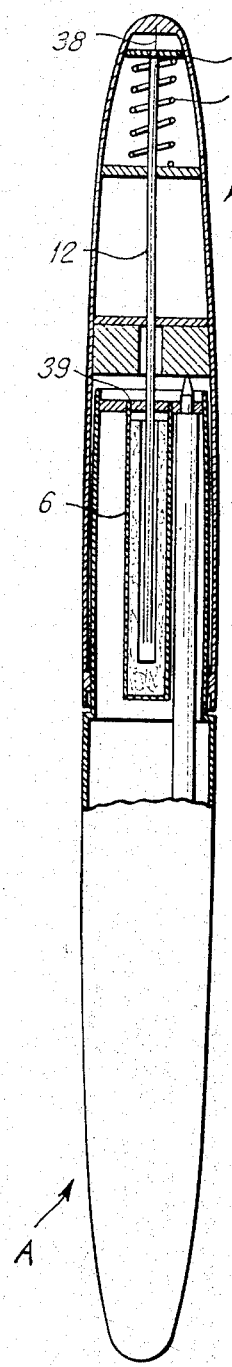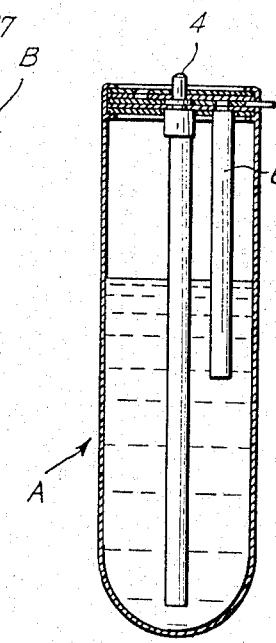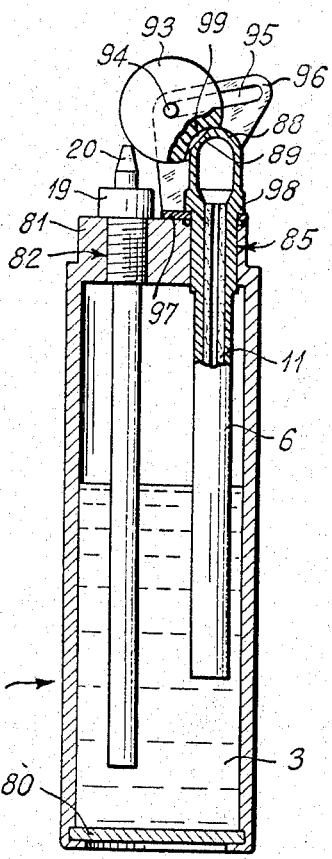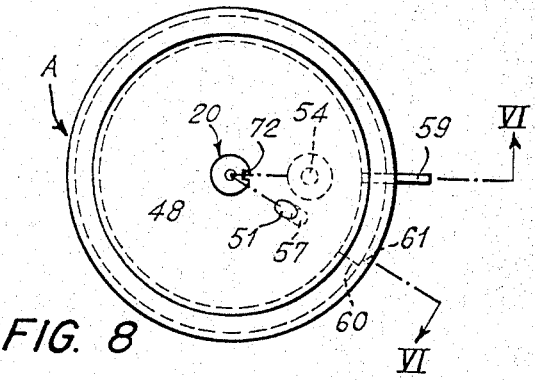

Jan. 2, 1968   V. SPRETER ET AL   3,360,965
GAS LIGHTER
Filed July 2, 1965   6 Sheets-Sheet 5
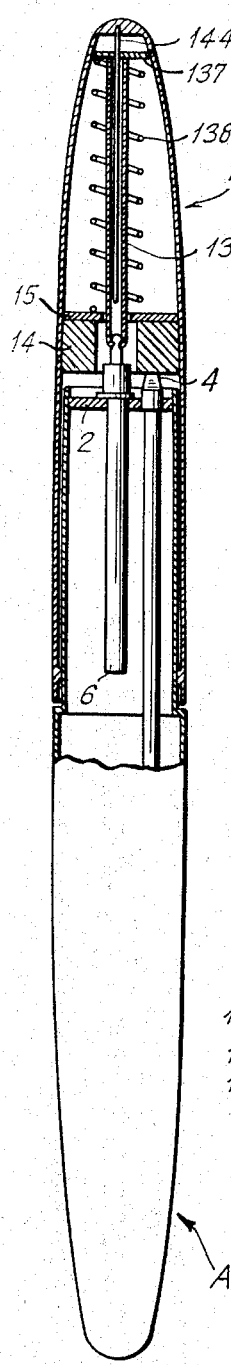
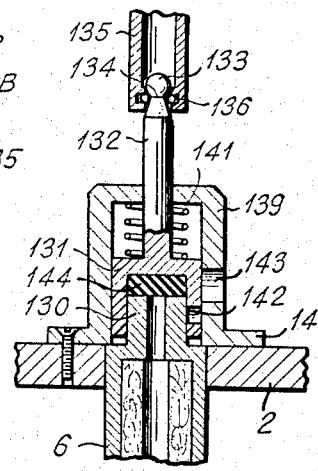
FIG. 15
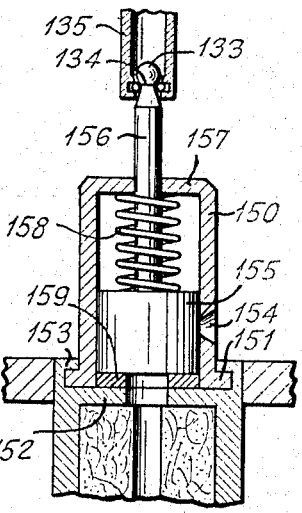
FIG. 16
FIG. 14
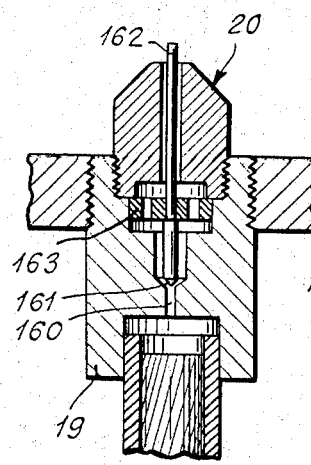
FIG. 17
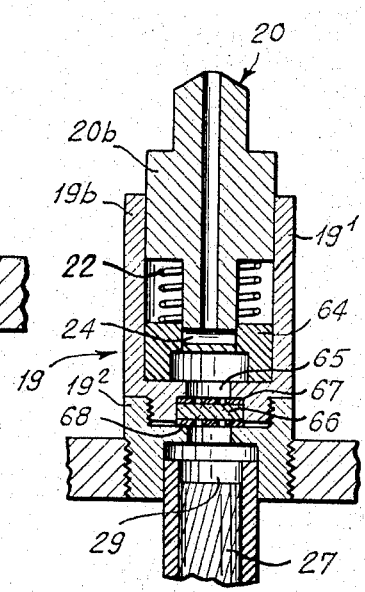
FIG. 12
INVENTORS.
VICTOR SPRETER
BY ERNEST HAMSAG
ATTORNEYS Jan. 2, 1968 V. SPRETER ETAL 3,360,965
GAS LIGHTER
Filed July 2, 1965 6 Sheets-Sheet 6

INVENTORS.
VICTOR SPRETER
ERNEST HAMSAG
BY Pennie, Edmonds, Morton, Taylor and Adams
ATTORNEYS United States Patent Office 3,360,965
Patented Jan. 2, 1968

3,360,965
GAS LIGHTER
Victor Spreter, 29 Rue Sautter, and Ernest Hamsag, 19 Chemin des Crets-de-Champel, both of Geneva, Switzerland
Filed July 2, 1965, Ser. No. 469,254
7 Claims. (Cl. 67—7)

ABSTRACT OF THE DISCLOSURE

A fluid fuel burner, such as a cigarette lighter, having a metering device for discharging a discrete amount of pyrophoric material from a supply thereof to the atmosphere adjacent the burner nozzle each time the nozzle is opened.

This invention relates to a gas lighter comprising a liquified gas fuel tank, a burner through which the fuel can escape in the form of a jet of gas, means for controlling the opening and closing of such burner, and an igniter to ignite the jet of gas.

One of the objects of the invention is to provide a gas lighter wherein the igniter is neither a flint nor other electrical or mechanical ignition means.

The gas lighter according to the invention is characterized in that the igniter is formed from a substance adapted to ignite spontaneously in air, with which it is brought into contact by the said means.

In some embodiments of the lighter the igniter substance may act in the gas phase while in other embodiments of the lighter it may act in the liquid phase. In either case, the igniter substance may either be intimately mixed with the liquified gas fuel or be contained in a tank separate from the fuel tank.

The preferred substance used as a gas-phase igniter is aluminum borohydride, while the liquid-phase igniter will preferably be trimethyl aluminum.

However, the gas-phase igniter may alternatively be boron hydrides for example boranes, more particularly diborane, triborane, tetraborane and stable pentaborane ($B_5H_q$); silicon hydrides, for example silanes, more particularly monosilane, disilane and trisilane; alkyls, more particularly dimethyl zinc, trimethyl boron and triethyl boron; and carbonyls, more particularly carbonyl nickel, pentacarbonyl iron and dodecacarbonyl divanadium; the liquid-phase igniter substance may be alkyls other than trimethyl aluminum, more particularly triethyl aluminum, dimethyl boron, triisobutyl boron, tri n-propyl boron and diethyl zinc.

When the igniter substance is mixed with the fuel and said substance acts in the gas phase, the fuel used is preferably a double or triple-bond aliphatic hydrocarbon which is gaseous under normal pressure, more particularly 1,3-butadiene, 1-butene and acetylene. On the other hand, when the igniter substance acts in the liquid phase in mixture with said fuel, or when the igniter substance is separate from the fuel, the latter may be formed by any of the conventional gas-lighter fuels, such as butane, propane, a mixture of butane and propane, or another hydrocarbon mixture.

Some embodiments of a lighter according to the invention are illustrated diagrammatically and by way of example in the accompanying drawing, wherein:

FIG. 5 is a cross-sectional side elevation of a second embodiment of the invention;

FIG. 6 is a cross-sectional side elevation of a third embodiment of the invention;

FIG. 8 is a top plan view of the device shown in FIG. 6;

FIG. 9 is a cross-sectional side elevation of a fourth embodiment of the invention;

FIG. 12 is a partial sectional side elevation showing details of the burner portion of the device of FIG. 11;

FIG. 14 is a cross-sectional side elevation of a sixth embodiment of the invention;

FIG. 15 is a partial sectional side elevation of the control and closure elements of the device of FIG. 14;

FIG. 16 is a partial sectional side elevation of a modification of the elements shown in FIG. 15;

FIG. 17 is a partial sectional side elevation of a modification of the burner structure of FIG. 3;

Like reference numerals and symbols have been used in the various figures to denote like parts.

Figure 1:
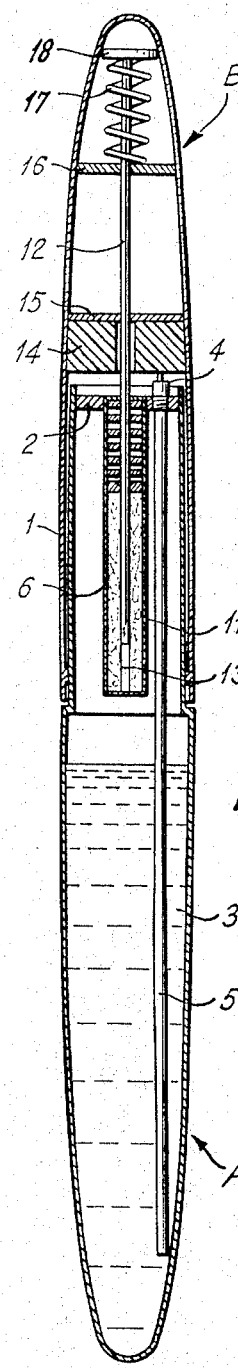
FIG. 1 is a cross-sectional side elevation of one embodiment of the invention.

With reference to the drawing, the gas lighter shown in FIG. 1 is of the shape of a fountain pen and comprises a hollow body A of circular section having at the top a smaller-diameter part 1 capped by a detachable cap B, retaining means, for example flexible means, being provided between the bottom part of the cap B and the top part 1 of the body A.

The body A is closed by a disc 2 to form a tank 3 for liquified gas fuel, the latter being fed via a wick in a tube 5 to a burner 4 which passes eccentrically through the disc 2.

A tube 6 also extends through the center of the disc 2 and continues inside the tank 3, the bottom end of the tube 6 being closed. The top part of the tube 6, which is shown in an enlarged scale in FIG. 2, contains a retaining ring 7 bearing against an inner shoulder 8 of the tube, and a series of sealing washers 9 of synthetic rubber or some other appropriate resilient material and spacer rings 10 alternatively, the top edge of the tube 6 being folded over inwards so as to clamp the elements 7, 9 and 10 against one another in co-operation with the shoulder 8. The bottom part of the tube 6 contains the liquid igniter substance, which is retained in an absorbent material 11, for example glass fiber or kieselguhr. The tube 6 thus forms a second tank in which the igniter substance is stored separately from the fuel contained in the tank 3.

The sealing discs 9, which form a closure system, are centrally pierced so that their material can be deformed to pass a needle 12 mounted inside the cap B along the axis thereof, the bottom part of the needle leading, as shown in FIG. 1, to a duct 13 which is left free by the absorbent material 11 and which promotes evaporation of the liquid igniter substance retained in the absorbent material 11.

The needle 12 which is movable axially with respect to the cap 8 passes successively, in the upward direction inside the cap, through a perforated plug 14 of flexible material intended to close the burner 4, a first perforated disc 15 connected to the plug 14 and intended to guide the needle, the system formed by the plug 14 and disc 15 being fixed to the cap B, and a second perforated disc 16 which is also fixed on the cap B and is intended to guide the needle. One of the ends of a coil spring 17 rests against the disc 16 while the other end of the spring bears against a disc 18 rigidly connected to the top end of the needle 12 and abutting the end of the cap B under the action of the spring 17. Thus when the cap B is removed from the body A the spring 17 is compressed by the friction exerted by the sealing discs 9 on the needle 12 driven by the cap. This compression of the spring 17 enables the needle 12 to be abruptly withdrawn at the end of its travel by the force of the spring 17 when the bottom end of the needle reaches the last disc 9 and when the cap B has itself been completely removed from the body A.

Figure 2:
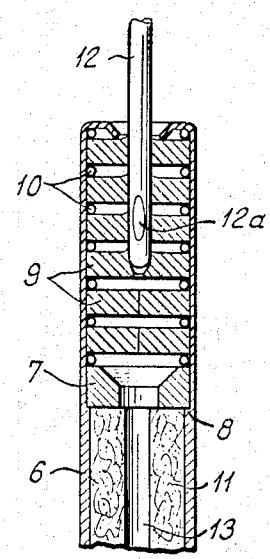
FIG. 2 is a partial sectional view showing certain details of the device in FIG. 1.

On withdrawal of the needle 12 from the igniter substance tank formed by the tube 6, the needle entrains a bubble of gas through the sealing discs 9, such bubble being held or sequestered in a cavity 12a formed at the bottom end of the needle and obviously being only a minute portion of the supply of igniter substance. If the needle terminates in a non-pointed end, for example a rounded end as shown in FIG. 2, the needle can entrain a small amount of gas in its wake under the effect of the vapor pressure of such gas. In such cases the cavity 12a may be dispensed with.

The igniter substance emerging in the gas phase ignites spontaneously on contact with air and ignites the fuel emerging in the gas phase from the tank 3 through the adjacent burner 4, which is opened by the removal of the cap B.

The cap B and the parts it contains thus form a means of controlling the opening and closing of the burner 4 and also controlling the discharge of the igniter substance.

Figure 3:
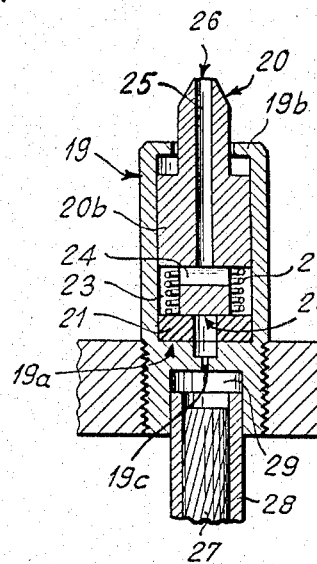
FIG. 3 is another partial sectional side view showing details of the burner structure of the device of FIG. 1.

FIG. 3 is a section to an enlarged scale showing the structure of the burner 4 by way of example. The burner illustrated comprises a bushing 19 screwed into a tapped aperture extending through the disc 2 of the fuel tank, and a nozzle 20 slidable inside the bushing 19 between an open position and a closed position. In the closed position (as illustrated), the base 20a of the nozzle is pressed from outside against a washer 21 of resilient material resting on an inner shoulder 19a of the bushing.

When the nozzle is freed of this external pressure, a coil spring 22 bearing against the washer 21 and acting on the bottom end of an intermediate thickened portion 20b of the nozzle lifts the latter to bring it into the open position in which the top end of the thickened portion 20b abuts the top edge 19b of the bushing, such edge having been bent over after introduction of the nozzle.

In the open position, the end 20a of the nozzle is moved away from the washer 21 so that the gas originating from the liquified gas fuel contained in the tank can pass between the washer 21 and the end 20b, and then to an annular duct 23, from which such gases escape to atmosphere through a diametric channel 24 and an axial channel 25 connecting channel 24 to the nozzle aperture 26.

The liquified gas fuel is fed from the tank to the bushing 19 via a wick 27 housed in a tube 28 whose top end is force-fitted in a recess formed at the bottom part of the bushing 19, the top of the tube 28 and part of such recess forming a vaporization chamber 29 for the liquid fuel, the gases resulting from such chamber then passing through an expansion hole or throttle 19c formed in the bushing.

Figure 4:
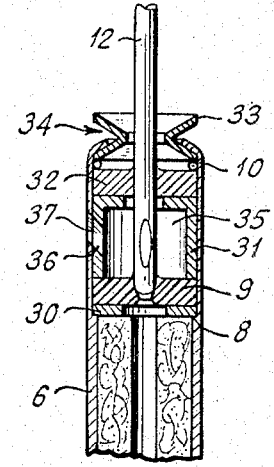
FIG. 4 is a partial sectional view of a modification of the detail shown in FIG. 2.

FIG. 4 illustrates a variant of the top of the igniter substance tank formed by the tube 6. In this variant, the top of the tube 6 contains a rigid supporting washer 30 resting against the inner shoulder 8 of the tube, a pierced sealing disc 9, a spacer bushing 31, a pierced disc 32 to brake the withdrawal of the needle 12 a spacer ring 10 and a retaining ring 33 formed with an outer peripheral groove 34 into which the top edge of the tube 6 is bent so as to clamp the components 30, 9, 31, 32, 10 and 33 against one another in co-operation with the shoulder 8.

By means of the bushing 31, a chamber 35 is formed between the two discs 9 and 32 and communicates with the atmosphere via two registering apertures 36 and 37, one of which is formed in the bushing 31 and the other in the tube 6. When the lighter is assembled, these apertures are situated above the disc 2 and are aligned with the burner 4 of the lighter, the projecting part of the tube 6 taking up a position in a recess provided for the purpose in the plug 14 of flexible material secured to the inside of the cap B.

When the needle 12 is withdrawn from the tube 6, the small amount of gas-phase igniter substance extracted by the needle is mixed with the air contained in the chamber 35 so that a microexplosion occurs in the latter, accompanied by a jet of flame through the lateral opening formed by the apertures 36 and 37, to ignite the fuel gas originating from the burner 4, which latter has been opened by withdrawal of the cap B.

In this case, the igniter substance tank is closed by a single pierced sealing disc 9 which closes immediately after withdrawal of the needle 12. If required, a closure system comprising a plurality of sealing discs, similar to the one shown in FIG. 2, can be used. Conversely, the closure system for the tube 6 in FIG. 2 can contain just a single sealing disc.

The lighter shown in FIG. 5 is similar to that shown in FIGS. 1 and 2 but differs therefrom essentially in that a duct extends axially through needle 12 and disc 18, a metal rod 38 secured at the top end to the cap B being slidable in said duct in relation to the needle, which is movable as in the previous embodiment. When the cap B is withdrawn from body A, the friction exerted on the needle 12 by the system for closing the tube 6, which in this case is formed by a perforated plug 39 of synthetic rubber, causes a spring 17 to be compressed and hence an upward movement of the rod 38 with respect to the needle. The bottom part of the duct, which is left free by the relative upward movement of the rod 38, which acts as a piston as it were, fills with gas-phase igniter substance. When the hollow needle 12 leaves the plug 39 the resistance of the latter to the withdrawal of the needle ceases and the spring 17 expands to produce a downward movement of the piston 38 with respect to the needle 12 to eject the igniter substance vapors contained in the bottom part of the needle duct, such vapors igniting in contact with the air near the burner 4 to ignite the fuel gas leaving the burner.

Figure 7:
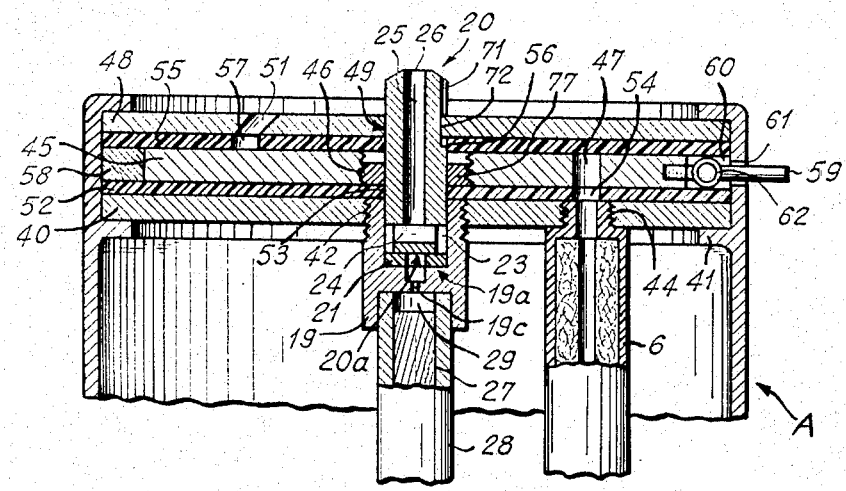
FIG. 7 is a partial cross-sectional side elevation of the upper portion of the device shown in FIG. 6.

The gas lighter shown in FIG. 6 comprises a hollow tubular body A closed by a device shown to an enlarged scale in FIG. 7. This closure device comprises a rigid metal disc 40 bearing on an inner peripheral shoulder 41 formed in the body A and containing a central tapped aperture 42 into which is screwed a bushing 19 and an eccentric tapped aperture 44; a rotary rigid metal disc 45 whose diameter is less than that of the disc 40 and which is formed with a central tapped aperture 46 and an eccentric aperture 47 whose radial distance from the center of the closure system is equal to that of the aperture 44; and a rigid metal disc 48 whose diameter is equal to the diameter of the disc 40 and which is formed with a central plain aperture 49 in which a nozzle 20 is slidable, such nozzle moving inside the bushing 19, the said disc also being formed with an eccentric aperture 51 which is offset at an angle to the aperture 44 and so inclined that its axis intersects the axis of the closure system above the nozzle 20, the radial distance of the inner orifice of such aperture 51 from the axis of the closure system being equal to that of the aperture 44 and of the aperture 47.

The closure system also comprises a sealing disc 52 of resilient material interposed between the discs 40 and 45, its diameter being equal to that of the disc 40 and being formed with a plain central aperture 53 in which the nozzle 20 can slide with frictional contact, and an eccentric aperture 54 registering with the aperture 44; a sealing disc 55 also of resilient material interposed between the discs 45 and 48 and identical to the disc 52 and being formed with a plain central aperture 56 in which the nozzle 20 can slide with frictional contact, and an aperture 57 registering with the bottom orifice of the inclined aperture 51; and a C-shaped spacer element 58 interposed between the discs 52 and 55 and disposed around the movable disc 45, such spacer element 58 having a thickness slightly greater than that of the disc 45 so that the latter can turn when the non-rotary elements are clamped against one another between the shoulder 41 and the top edge of the tubular body A after the latter has been folded over.

The movable disc 45 is adapted to be displaced through an angle between a first closing position, in which its aperture 47 registers with aperture 54 and screwthreaded aperture 44 (the position shown in FIG. 7) and a second opening position in which its aperture 47 registers with the apertures 51 and 57. The disc 45 is actuated by a lug 59 connected therewith and extending through the space 60 between the ends of the C-shaped spacer 58 and a slot 61 formed in the wall of the tubular body A in register with the space 60. The slot 61 is so dimensioned as to operate as a travel limiting means for the lug 59 so that the aperture 47 may be correctly situated in register with the apertures 54 and 57 in one or the other of the positions of the movable disc 45. To ensure that the disc 45 returns to its normal closing position, the closure system comprises a coil spring 62 housed in the space 60 between the lever 59 and one of the ends of the C-shaped spacer 58.

Thus when the movable disc 45 is actuated to the opening position against the force of the spring 62, a small quantity of igniter substance in the gaseous state originating from the tube 6 in the body A—such tube being screwed at the top end into the tapped aperture 44 of the bottom disc 40—is fed to the apertures 51 and 57 where it ignites in contact with air to give a small jet of flame extending towards the nozzle 20.

The angular movement of the disc 45 also controls the opening and closing of the burner 4 by axial displacement of the nozzle 20. This axial displacement of nozzle 20 is obtained by an externally screwthreaded nut 77 rigidly connected to the nozzle 20. The nut 77, which is screwed into the tapped aperture 46, is of a smaller thickness than the rotary disc 45 so that it has a certain freedom of axial movement between the sealing discs 52 and 55.

The pitch of the screwthreads of the tapped aperture 46 and the nut 77 is so selected that the nozzle performs an upward axial movement when the disc 45 is moved from its closing position to the opening position in order to move the end 20g of the nozzle away from a washer 21 of flexible material resting on an inner shoulder 19a of the bushing 19. When the end 20g moves away from the washer 21, the gases originating from the liquified gaseous fuel contained in the tank formed by the tubular element A can pass between the washer 21 and the end 20a to enter an annular conduit 23 formed by the reduction of the diameter of the bottom part of the nozzle 20, from which they escape to atmosphere via a diametric duct 24 and an axial duct 25 connecting the duct 24 to the nozzle orifice 26. To prevent the movable disc 45 from rotating the nozzle 20 and its nut 77, a catch 72 formed in the central aperture 49 of the top disc 48 engages in a groove or slot 71 formed in the top part of the nozzle.

The liquified gaseous fuel contained in the reservoir formed by the tubular body A is fed to the bushing 19 via a wick 27 housed in a tube 28 whose top end is force-fitted in a recess formed in the bottom part of the bushing 19, the top part of the tube 28 forming a vaporization chamber 29 for the liquid fuel, the gases resulting from such chamber then passing through an expansion hole or throttle 19c.

The gas lighter shown in FIG. 9 differs from the previous embodiment mainly in its control system. This lighter comprises a body A formed by an inverted cylindrical cup the open lower end of which is closed by a circular element 80 force-fitted into the body A and retained by the bentover edge of the cup to form a tank 3 for the liquid gas fuel.

The upper end 81 of the cup forms the lighter head and is formed with a tapped aperture 82 into which is screwed a bushing 19 containing a nozzle 20 and a plain aperture 85 through which a tube 6 is force-fitted, the bottom end of the tube being closed and said tube containing an absorbent material 11 in which the liquid igniter substance is retained.

The top of the tank for the igniter substance projects beyond the end 81 and is formed by a domed head 88 formed with an aperture 89 having an inclined axis and extending towards the nozzle 20 on assembly of the lighter so that the nozzle axis and the axis of the aperture 89 intersect above the nozzle 20.

Since the burner for this lighter embodiment is similar to the one shown in FIG. 3, its construction and operation will not be repeated here.

The burner 20 and aperture 89 are opened and closed by a wheel 93 borne by a pivot 94 whose ends can slide rotatably in slots 95 formed in the two cheeks 96 of a U-shaped member whose base 97 is retained on the end 81 by a shoulder 98 formed on the top of the tube 6. In the closing position of the control system, the wheel 93 closes the aperture 89 with the aid of a cavity 99 formed in the wheel periphery while the wheel 93 also keeps the nozzle 20 inside the bushing 19 against the action of the coil spring 22. The burner and aperture 89 are opened by a combined rotary and sliding movement of the wheel 93 which enables the nozzle firstly to be freed of the pressure exerted on it by the wheel so that it can move away from the washer 21 by means of the spring 22, and secondly opens the aperture 89 in the head 88 of the igniter substance tank so that there is a prior discharge of fuel gas. As soon as the aperture 89 is uncovered there will be either an excess pressure in the tube 6 or a slight negative pressure. In the former case the igniter substance vapor is ejected and ignites spontaneously. In the second case, there is a slight entry of air which results in a microexplosion inside the tube 6 thus expelling the igniter substance through the aperture 89, such substance igniting on contact with the air. In either case the igniter substance will provide ignition for the lighter.

Figure 10:
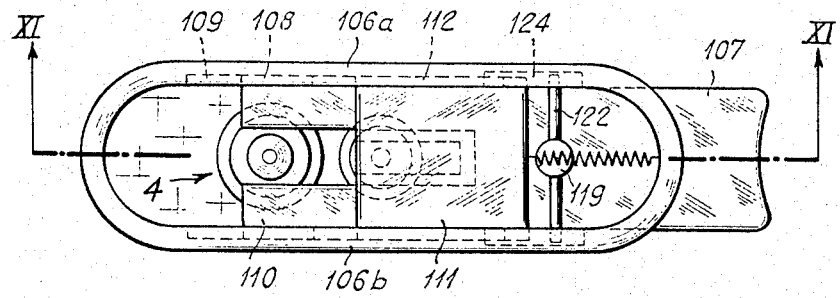
FIG. 10 is a top plan view of a fifth embodiment of the invention.
Figure 11:
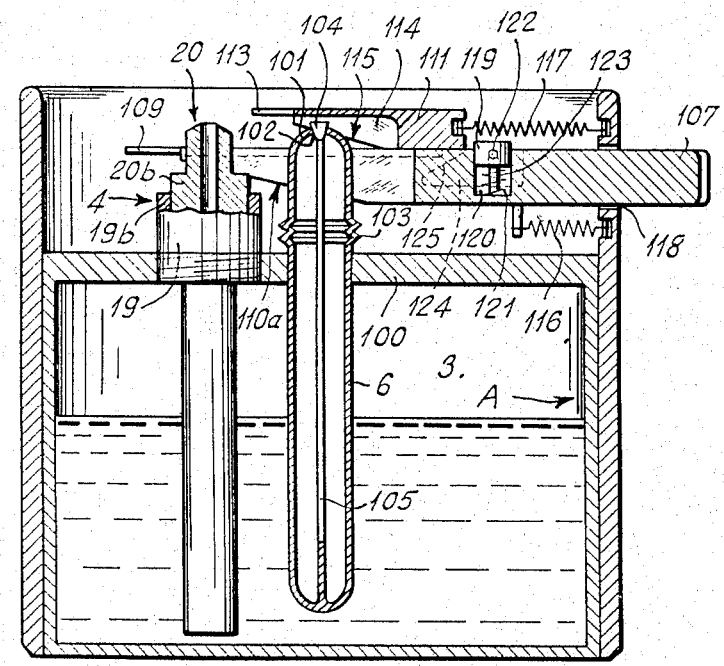
FIG. 11 is a sectional view taken along line XI—XI in FIG. 10.

The lighter shown in FIGS. 10 and 11 comprises a body A, forming a tank 3 for liquified gas fuel, of a flat shape with two parallel faces. The head 100 of the body A has a burner 4 extending therethrough, together with the top of a tube 6 which acts as a tank for the igniter substance. The upper end part of the igniter substance tank 6 is formed by a metal dome 101 formed with an aperture 102 and is connected in sealing-tight relationship to the rest of the tube by means of a flexible bellows 103 enabling the dome to perform an axial movement. The aperture 102 is normally closed by a valve element 104 secured to the top end of a rod 105 rigidly connected to the end of the tube 6. Contrary to the system shown in FIG. 3, the burner 4 is opened by the nozzle 20 being pushed in. In this burner, which is shown in an enlarged scale in FIG. 12, the diametric duct 24 of the nozzle 20 is normally closed by a ring 64 of flexible material whose section is in the form of an inverted L. When the nozzle 20 is pushed inside the bushing 19 against the action of the spring 22, the smaller-section bottom part of the nozzle slides through the ring 64 to free the ends of the duct 24 which thus communicates with the evaporation chamber 29 between the wick 27 and the bushing 19 via an expansion device 65 which replaces the expansion hole 19c. This expansion device 65 is disposed across the passage connecting the chamber 29 to the nozzle 20 and is housed in a recess formed between two parts $19^1$ and $19^2$ of which the bushing 19 is formed in this case.

The expansion device 65 comprises a disc 66 of compressible porous material, e.g. felt, and two rigid apertured discs 67 and 68 disposed on either side of the disc 66. In the position illustrated, the porous disc 66 is compressed to its maximum between the perforate discs 67 and 68 by the two parts $19^1$ and $19^2$ of the bushing, thus limiting the flow of fuel gas to the minimum. When the part $19^1$ is unscrewed with respect to the part $19^2$, the compression on the disc 66 can be reduced to increase the flow of gas through the expansion device. This device thus enables the height of the burner flame to be controlled as required.

The body A is enclosed by two halves 106a and 106b which are interconnected by any means, for example a metal clamp in the form of a flattened U-shaped ring bent over the top edges of the halves 106, and an end with a peripheral rim covering the bottom edges of these halves.

The top edges of the halves 106 extend substantially beyond the head 100 of the body A so as firstly to protect the nozzle 20 and the dome 101 and secondly form a recess containing the lighter control mechanism. This mechanism comprises a fork 107 edged with runners 108 engaging in guides 109 formed as grooves or slots in the walls of the halves 106. The bottom faces of the teeth 110 of the fork 107 have bevelled faces 110a against which bears the thickened portion 20b of the nozzle 20 under the action of the spring 22.

The lighter control mechanism also comprises a second sliding element 111 which is also edged with runners 112 engaging in guides 113 formed as grooves or slots in the walls of the halves 106 in parallel relationship to the guides 109 and at right-angles to the axis of the nozzle 20. The front part of the sliding element 111 has a recess 114 overlapping the element 104. The bottom side edges 115 of this recess part are bevelled and rest on the dome 101 of the igniter substance tank.

The fork 107 and the sliding element 111 are subject to the action of return springs 116 and 117 which urge these two components to their inoperative positions. When the fork 107 is actuated by application of pressure on its right-hand end which passes through the halves 106 via an aperture 118, the fork initially opens the burner 4 by driving the nozzle 20 into the bushing 19 and then causing the element 111 to slide, such element being engaged by a stop 119 normally situated out of range of the rear edge of the element 111. The latter in turn opens the aperture 102 by driving in the dome 101 against the action of the bellows 103. The dome 101 also reduces the volume of the tank 6 as it is driven in and thus ejects a small amount of igniter substance vapor, which ignites spontaneously on contact with the air. The resultant flame is directed by the surfaces of the recess 114 towards the fuel gas originating from the nozzle 20 to ignite the lighter.

To prevent igniter substance vapors from escaping for the entire period that the lighter is alight, the control mechanism is so designed that once a quantity of igniter substance vapors has been ejected from the tank 6 the aperture 102 if the latter is automaticaly closed. To this end, the stop 119 is mounted slidably in a recess 120 formed in the fork 107. The stop 119 is urged to its normal projecting position by a coil spring 121 bearing against the end of the recess 120. The stop 119 is also retained in the recess by a pin 122 which extends through the stop and a transverse slot 123 formed in the fork, the ends of the pin 122 engaging in two identical cavities 124 formed in register in the walls of the halves 106. The top edges 125 of these cavities 124 form cams which, after displacement of the fork 107 over a given distance, result in retraction of the stop 119 inside the recess 120 to free the element 111 which can thus return to its starting position under the force of the return spring 117. When the fork 107 is released, the stop 119 slides beneath the element 111 to return to its normal projecting position at the end of the travel of the fork 107. The stop 119, spring 121, pin 122 and cams 125 thus form a catch system. The return movement of the sliding element 111 and of the fork 107 enables the dome 101 and the nozzle 20 to resume their normal closed position. This return movement is also limited by the guides 109 and 113, the ends of which act as stops.

Figure 20:
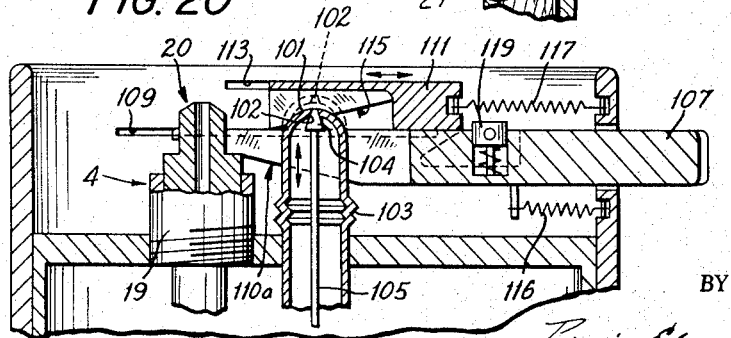
FIG. 20 is a partial sectional view of a modification of the device shown in FIG. 11.

In a first variant of the lighter illustrated in FIGS. 10 and 11, and shown in FIG. 20, the bellows 103 is normally compressed in the closed position of the dome 101, the valve element 104 occupying a reversed position inside the dome from that shown in FIG. 11. The inclination of the bevelled surfaces 115 is reversed from that shown in FIG. 11 so that when the sliding element 111 is actuated the dome 101 is lifted by the bellows 103, thus opening the igniter substance tank. If the igniter substance vapors are at a pressure close to atmospheric pressure, the increase in the volume of the tank will result in a slight intake of air which will in turn result in a microexplosion to eject a small quantity of igniter substance vapors. If the vapor pressure inside the tank is substantially higher than atmospheric pressure, vapors will be ejected without any prior microexplosion. In either case the vapors ignite on contact with the outside air to ignite the lighter.

Figure 13:
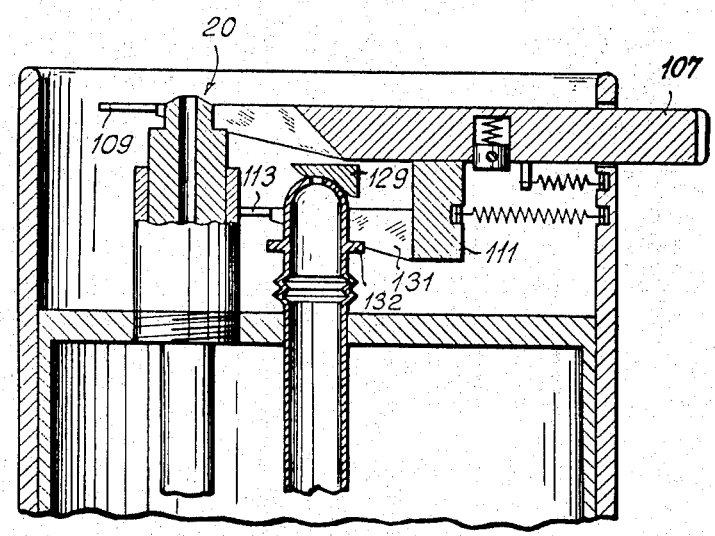
FIG. 13 is a partial sectional side elevation of the upper portion of a modification of the device shown in FIGS. 10 and 11.

In a second variant shown in FIG. 13, the aperture 102 is closed by a closure element 129 fixed laterally to the halves 106. Also, the positions of the fork 107 and the sliding element 111 have been changed over, as have also the guides 109 and 113 and the catch system. The bottom surface of the closure element 129 is so profiled as to form a deflector to direct the igniter substance vapor after ignition to above the orifice of the nozzle 20. To promote guidance of this flame, the deflector element 129 may also have cheeks, whose inner surfaces are disposed in the same vertical plane as the inner surfaces of tips of the fork 107. The front of the sliding element 111 in this variant comprises two members 131 bearing on either side of the dome 101 on a shoulder 132 rigidly connected to the latter.

The lighter shown in FIG. 14 is similar to that shown in FIG. 1. It differs therefrom in its control and closure means, the closure means and part of the control means being shown in an enlarged scale in FIG. 15. In this embodiment, the top part of the tube 6 has a smaller-diameter extension 130 capped by a movable cap 131 rigidly connected to a rod 132 whose rounded top end 133 is formed with a peripheral groove 134. This rounded end 133 is capped by a sliding tube 135 the bottom end of which is provided with a flexible split ring 136 housed in a groove inside the tube and engaging in the groove 134. The top end of the tube 135 is rigidly connected to a disc 137 resting on a compression spring 138 which bears on a pierced disc 15 rigidly connected to the cap B. The sliding tube 135 is guided firstly by the disc 15 and secondly by a rod 144 secured to the end of the cap B and extending through the disc 137 to terminate near the bottom end of the tube 135 inside the latter. The rod 132 of the cap 131 also extends through a bushing 139 having a flange 140 secured to the disc 2 of the body A and extends through a compression spring 141 mounted between the cap 131 and the end of the bushing 139.

When the cap B is withdrawn, the spring 138 is compressed by the traction exerted on the cap, and the tube 135 whose bottom end is retained on the rod 132 of the cap 131 slides through the disc 15 and the plug 14. When the spring 138 is at maximum compression, the spring 141 is in turn compressed to enable the cap 131 to be lifted. This lifting movement brings a lateral outlet aperture 142, formed in the cap 131 and normally closed by the extension 130, to a position above the latter and in register with an aperture 143 formed in the bushing 139, and in this position the spring 141 has its maximum compression so that the split ring 136 has to move out of the groove 134, with resultant separation of the tube 135 and rod 132. When this separation has taken place, the tube 135 is pushed back inside the cap B by the spring 138 and the cap 131 resumes its normal position to close the igniter substance tank under the action of the spring 141. This axial reciprocation of the cap 13, which occurs whenever the cap B is removed, has the following effect: either, on closure, a small quantity of igniter substance vapor is ejected through the apertures 142 and 143 and ignites on contact with air or, on opening, a small quantity of air enters and produces a microexplosion to eject a flame through the apertures 142 and 143, depending on the pressure prevailing inside the igniter substance tank. To prevent any unintentional rotation of the cap 142 with respect to the bushing 139, the rod 132 and the bushing aperture through which it extends may have a non-circular section. Also, to ensure effective closure of the igniter substance tank, the cap 131 is provided with a sealing disc 144, for example of resilient material, which is fixed to the inside of the cap.

When the cap B is replaced on the body A, the tube 135 will again cap the head 133 of the rod 132, and since the disc 137 and the cap 131 bear against the end of the cap B and against the extension 130 of the tube 6, respectively, the flexible split ring 136 is forced up the head 133 to re-engage in the groove 134.

The control system also ensures the flow of fuel gas through the burner 4 freed by the plug 14 while enabling the cap B to be removed for a sufficient distance to ensure the arrival of air in the region of the bushing 139 before ejection of the igniter substance vapors.

FIG. 16 shows a variant of the closure and control means shown in FIG. 15. In this variant, the tube extension is formed by a bushing 150 which is in the form of a cylinder and has a flange 151 resting on an inner shoulder 152 of the tube 6 whose top edge 153 is folded over onto the flange 151. This bushing 150 has a lateral outlet aperture 154 normally closed by a piston 155 rigidly connected to a rod 156 extending through the end 157 of the bushing 150 and a compression spring 158 mounted between the piston 155 and the end 157, the top end of the rod 156, like the rod 132, being provided with a rounded head 133 and a groove 134 adapted to co-operate with the tube 135. In the closure position of the piston 155, the latter is pressed against a sealing washer 159 of resilient material resting on the projecting edge of the shoulder 159.

The burners used in the various embodiments hereinbefore described may be replaced by other burners of conventional or other design. For example, the burner used in the lighters shown in FIGS. 1, 5, 9 and 14 may be replaced by a burner without a valve element, i.e. a burner of simple design which is closed by the plug 14 which closes the fuel gas outlet aperture. The burner used may alternatively enable the flow of fuel gas to be adjusted as required. A burner of this kind is shown in FIG. 17 and comprises a nozzle 20 screwed into a bushing 119 formed with a fuel gas entry aperture 160. The orifice of the aperture 160 is controlled by a valve element 161 formed by the bottom end of a rod 162 whose top end continues beyond the nozzle 20.

Thus when a pressure is exerted from outside on the rod 162, the valve element 161 will close the aperture 160. In the absence of an external pressure, the opposite pressure exerted by the fuel gas on the valve element 161 lifts the rod 162 to flow through the burner. To prevent unintentional upward movement of the rod 162, the latter is rigidly connected to a perforated washer 163 retained in a recess formed between the nozzle 20 and the bushing 19, in which recess the washer can move axially.

The axial travel of the rod 162 is limited firstly by the closure position of the valve element 161 and secondly by the position of contact between the washer 163 and the nozzle 20. On assembly, this travel is limited to a minimum to ensure a minimum flow of fuel gas. If the nozzle 20 is unscrewed, the travel of the rod 162 is increased so that the flame height can be increased as a result of an increase in the flow of gas. If required, a coil spring may be provided between the washer and the surface with which the valve element 161 co-operates.

In all the embodiments of the lighter hereinbefore described, the igniter substance acts in the gas phase and is separate from the fuel. Also to ensure spontaneous ignition of the igniter substance, which is aluminum borohydride in this particular case, the above-described lighters have been so designed that the igniter substance vapors initially come into contact not with the fuel, which is a mixture of butane and propane in this particular case, but with air. When the igniter substance is aluminum borohydride, the latter may be used in the pure form or, preferably, in admixture with a hydrocarbon having a low vapor pressure, for example kerosene, or with freon, or alternatively another gas or liquid which is inert with respect to the borohydride and which enables the borohydride vapor pressure to be reduced in order to attenuate the violence of the microexplosions which may occur when the borohydride comes into contact with air.

Figure 18:
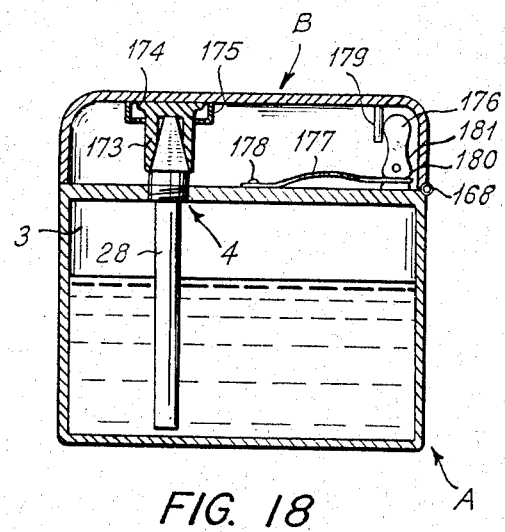
FIG. 18 is a cross-sectional side elevation of a seventh embodiment of this invention.
Figure 19:
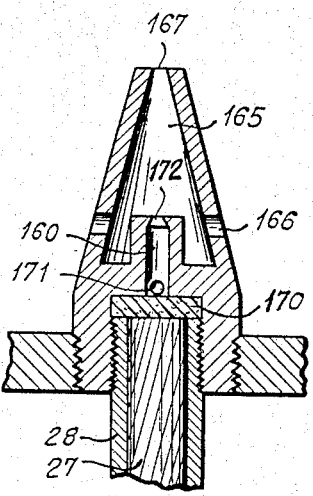
FIG. 19 is a partial sectional view of the control and burner portion of the device of FIG. 18.

FIGS. 18 and 19 show an embodiment of a lighter wherein the igniter substance and the fuel are intimately mixed and contained in a common tank, the igniter substance acting in the liquid phase. In this particular case the igniter substance is trimethyl aluminum and the fuel is a conventional mixture of butane and propane, the igniter substance and the fuel being mixed in a volumetric ratio ranging from 1:20 to 1:2 in the liquid state.

The liquid mixture of fuel and igoiter substatce is fed from the tank formed by body A via a wick 27 in a tube 28 screwed into the end of the burner 4 which is formed by a Bunsen-type nozzle. As will be apparent from FIG. 19, the top end of the wick 27 is pressed against a disc of felt or other permeable material 170 covering the bottom end of the entry aperture 160. After flowing through the disc 170 the fuel vaporizes in the aperture 160. The igniter substance, on the other hand, remains liquid because it has a low vapor pressure and accumulates in the aperture 160 on the disc 170 to form a droplet 171. When the latter has become sufficiently large to plug the aperture 160, it is propelled by the vaporized fuel through the aperture 160 and the chamber 165 in which it comes into contact with the air entering via the lateral apertures 166 with resultant spontaneous ignition of the igniter substance near the orifice 167 of the nozzle and ignition of the fuel gas. Except for the orifice 172, the aperture 160 preferably has a diameter ranging from 0.5 to 1 mm. to permit the formation of droplets of a corresponding size. It is also preferable that once the droplet has formed, it should be propelled along a rectilinear path as permitted by the aperture 160.

When the lid B which is hinged to the body A at 168 has been swung down into the closed position (FIG. 18), a cap 173 of non-inflammable flexible material caps the burner to close the orifice 167 and the apertures 166. This cap 173 is of circular section and has a peripheral bead 174 housed with clearance in a rimmed retaining element 175 which enables the cap to fit the nozzle despite the angular movement of the lid B.

To prevent unintentional opening of the lid B, the lighter is provided with a mechanism which provides temporary resistance to opening. This mechanism, which is known, comprises a lever 176 mounted rockably on the body A. The bottom part of the lever 176 has a flat surface which rests on one end of a spring blade 177 whose other end is fixed to the body A at 178. In the closed position of the lid B the top part of the lever 176 bears, under the action of spring 177, against a small plate 179 rigidly connected to the lid B to hold the latter in the closed position. When the lid B is opened, plate 179 rocks the lever 176 and during this movement a shoulder 180 on lever 176 temporarily pushes the spring blade 177 down and when the lever has pivoted through a little more than 90° the surface 181 of the lever is brought into contact with the spring blade, the shoulder 180 then being freed. In this position the lever is free of the plate 179. On the closing movement, the lever 176 slides along the inner face of the lid B which, as it pivots, rocks the lever against the action of the spring 177 into the position illustrated in the drawing, in which the lever again exerts a pressure on the plate 179.

When the liquid-phase igniter substance is separate from the fuel, the lighter shown in FIGS. 1 to 3 may be used with, if required, the variant shown in FIG. 4. In this case the igniter substance is withdrawn from its tank in the form of drops in the aperture formed in the needle.

We claim:

1. A liquified gas fuel burning device comprising a fuel container, a burner nozzle, a fuel supply line communicating between the fuel container and the burner, valve means for opening and closing the burner nozzle, means for holding a supply of liquid pyrophoric igniter substance, igniter discharge control means for entraining a discrete spontaneously-igniting amount of the igniter substance for discharging to the atmosphere adjacent fuel issuing from the burner, and means operable with opening of the burner nozzle valve for discharging said discrete spontaneously-igniting amount of the igniter substance to the burner atmosphere, the igniter discharge control means including means for introducing condensible vapors of the igniter substance to the fuel supply line in amount sufficient to provide a fuel-blocking bubble of liquid igniter substance in said line, whereby the bubble of igniter substance is forcibly ejected by the fuel into the burner atmosphere.

2. A liquified gas fuel burning device comprising a container for a liquid mixture of the fuel and a normally-liquid pyrophoric igniter substance, a burner nozzle, a supply line communicating between the fuel container and the burner, valve means for opening and closing the burner nozzle, and igniter discharge control means for discharging a discrete spontaneously-igniting amount of the igniter substance to the atmosphere adjacent fuel issuing from the burner, the igniter discharge control means including trapping means for condensing in the supply line an amount of the vapors of the igniter substance sufficient to provide a fuel-blocking bubble of liquid igniter substance in the line when the burner nozzle valve is opened, whereby the bubble is ejected into the burner atmosphere with continued flow of fuel vapor from the container to the burner.

3. A burning apparatus for domestic use including a reservoir for fluid fuel, a burner communicating with the reservoir, a fuel valve for controlling the escape of fuel from the burner, control means for opening and closing the valve at will, characterized by the fact that it further includes a second reservoir containing a supply of fluid pyrophoric substance, a second valve for controlling the escape of the pyrophoric substance, ignition control means for opening and closing the second valve, and dosage metering means adapted to limit to a determined quantity and to sequester the pyrophoric substance extracted from the second reservoir upon each actuation of the ignition control means and to discharge the determined quantity in the vicinity of the burner in such manner that the spontaneous combustion of the pyrophoric substance ignites the fuel escaping from the first reservoir, the determined quantity of pyrophoric substance being only a minute portion of the supply thereof.

4. A liquified gas fuel burning device comprising a fuel container, a burner nozzle communicating with the fuel container, valve means for opening and closing the burner nozzle, means for holding a supply of a fluid pyrophoric igniter substance, igniter discharge control means for sequestering and entraining a discrete spontaneously-igniting amount of the igniter substance for discharge to the atmosphere adjacent fuel issuing from the burner, the entrained discrete amount of igniter substance being only a minute portion of said supply thereof, the igniter discharge control means including a normally-closed chamber and transfer means for transferring said discrete amount of igniter substance from the igniter supply to the chamber, and means operable with opening of the burner nozzle valve for actuating the igniter control means to discharge said discrete spontaneouly-igniting amount of the igniter substance from the chamber to the burner atmosphere.

5. A device according to claim 4 including an igniter ignition chamber positioned in communication both with the igniter supply control means and with the ambient atmosphere adjacent the burner nozzle.

6. A device according to claim 4 in which the means for holding a supply of fluid pyrophoric igniter substance comprises a container separate from the fuel container.

7. A device according to claim 4 in which the means for holding a supply of fluid pyrophoric igniter substance comprises liquified gas fuel stored in the fuel container.

References Cited

UNITED STATES PATENTS

| | | | |
|---|---|---|---|
| 2,503,472 | 4/1950 | Chilowsky | 67—3 X |
| 2,867,081 | 1/1959 | Kimmel | 60—210 |
| 2,959,007 | 12/1960 | Gregory et al. | 60—39.82 |
| 3,085,411 | 4/1963 | Daugherty | 67—7 |
| 3,116,599 | 1/1964 | Campbell | 60—39.82 X |

EDWARD J. MICHAEL, *Primary Examiner.*